United States Patent [19]

Valette

[11] Patent Number: 4,796,226
[45] Date of Patent: Jan. 3, 1989

[54] READING HEAD IN INTEGRATED OPTICS FOR READING INFORMATION RECORDED ON A MAGNETIC SUPPORT

[75] Inventor: Serge Valette, Grenoble, France

[73] Assignee: Commissariat A L'Energie Atomique, Paris, France

[21] Appl. No.: 122,400

[22] Filed: Nov. 19, 1987

[30] Foreign Application Priority Data

Nov. 18, 1986 [FR] France ............................ 86 16002

[51] Int. Cl.$^4$ ............................................. G11C 13/06
[52] U.S. Cl. ................................. 365/122; 350/375; 365/124
[58] Field of Search ..................... 365/10, 122, 124; 350/374, 375

[56] References Cited

U.S. PATENT DOCUMENTS

| 3,576,547 | 4/1971 | Aldrich | 365/124 |
| 3,859,643 | 1/1975 | Borrelli | 365/10 |
| 3,990,037 | 11/1976 | Carlo | 365/10 |
| 3,990,059 | 11/1976 | Carlo et al. | 365/10 |
| 3,996,576 | 12/1976 | Bullock | 365/10 |
| 4,220,395 | 9/1980 | Wang | 350/96.12 |
| 4,497,007 | 1/1985 | Greiner et al. | 365/10 |

FOREIGN PATENT DOCUMENTS 3543775 6/1986 Fed. Rep. of Germany .
2355229 1/1978 France .

OTHER PUBLICATIONS

Japanese Patent Abstracts, vol. 7, No. 101 (P-194) (1246), 28 Apr. 1983, & JP-A-58 23 337 (Cannon K.K., 12.02.83.
IEEE Transactions on Instrumentation and Measurement, vol. 25, No. 1, Mar. 1976, pp. 1-7, New York, US, J. E. Thompson et al.

Primary Examiner—James W. Moffitt
Attorney, Agent, or Firm—Nutter, McClennen & Fish

[57] ABSTRACT

The head comprises a light source (S), a polarizer (P), a parabolic mirror (MP1), a second parabolic mirror (MP2), a polarization converter grating (RCP), a reflector (M), a separating plate (LS) and a detector (D). The beam diffracted by (RCP) constitutes a reference beam and the beam which has passed through (RCP) an analysis beam. The interference state of these two beams is dependent upon the orientation of the magnetization of the support to be read.

9 Claims, 6 Drawing Sheets

READING HEAD IN INTEGRATED OPTICS FOR READING INFORMATION RECORDED ON A MAGNETIC SUPPORT

DESCRIPTION

The present invention relates to an integrated optics reading head for reading information recorded on a magnetic support.

Figure 1A:
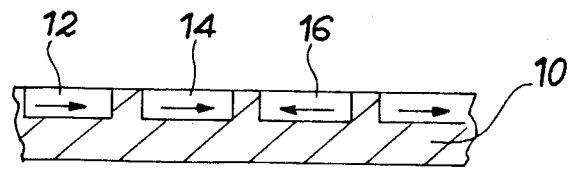
Figure 1B:
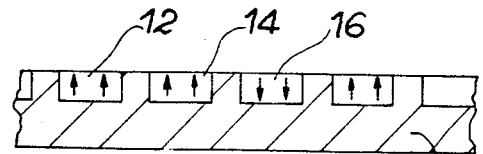

Magnetic recording is a procedure comprising creating in a magnetic support (disk, tape, etc.) zones having a magnetization in a clearly determined direction. In FIG. 1a, it is possible to see a magnetic layer 10, in which the domains 12, 14, 16 etc. have a magnetization parallel to the support, but directed sometimes to the right and sometimes to the left, reference then being made to parallel recording. In FIG. 1b, the same magnetic layer 10 has domains 12, 14, 16, whose magnetization is perpendicular to the plane of the support and directed sometimes upwards and sometimes downwards, reference then being made to perpendicular recording.

In each of these cases, it is possible to associate with a particular magnetization direction a logic state 1 and with the opposite direction a logic state 0. The complete support then contains a binary information formed from 1 and 0.

The information density is greatest in the case of perpendicular recording. Thus, it is this type of recording which is now being developed and this will be used as an example hereinafter, without however parallel recording being excluded from the application of the invention.

The reading of a magnetic support takes place with the aid of a reading head able to detect the magnetization direction of the support. To this end, it is possible to use a device having a pole piece surrounded by a coil. The passage of the magnetic support beneath said pole piece induces a current in the coil, whose direction indicates the direction of the magnetization of the support.

However, for reasons associated with the technology of magnetic reading heads, it is hardly possible to take optimum advantage of the possibilities offered by perpendicular recording. For this reason attempts are made to realize optical reading means for said supports, because optical devices do not suffer from the same limitations. The principle of the optical reading of a magnetic support is known and is referred to in FIGS. 2 and 3.

A magnetic medium has the property of transforming a light beam with linear polarization into a light beam with elliptical polarization. When working in reflection, this phenomenon is called the KERR effect, while in transmission, it is called the FARADAY effect.

Figure 2:
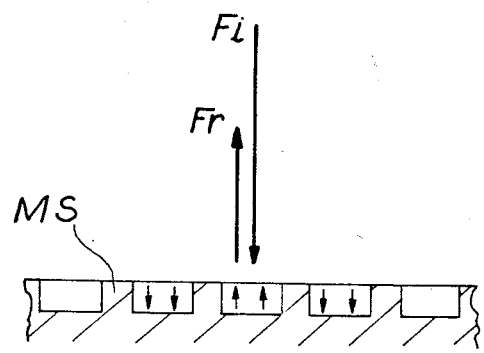
Figure 3:
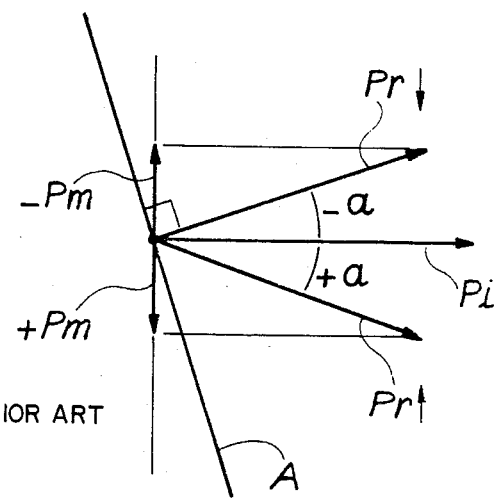

In the case, where an incident beam Fi of linear polarization Pi is supplied to a magnetic support MS, the reflected beam Fr (FIG. 2) has an elliptical polarization Pr resulting from the appearance of a small direction component perpendicular to the polarization direction of the incident beam (FIG. 3). The combination of the incident polarization component Pi and the component +Pm or −Pm due to the effect of the magnetic field gives vectors Pr ↑ or Pr ↓, which form with Pi an angle +a or −a, as a function of the direction of the magnetic field which has interacted with the light beam.

For detecting the rotation direction, use is made of an analyzer, whose direction is not perpendicular to the incident polarization direction Pi, but is perpendicular to one of the directions Pr ↑ or Pr ↓. This is represented in FIG. 3, where line A represents the polarization direction transmitted by the analyzer.

In such an arrangement, behind the analyzer is obtained a light intensity equal either to 0, or to $A^2 \sin^2 2a$. In the case of FIG. 3, the analyzer is mounted perpendicular to Pr ↓, which implies that the intensity of the light beam transmitted by said analyzer is zero if the magnetic induction read is directed downwards ( ↓ ) and equal to $A^2 \sin^2 2a$ (in which A is an amplitude), if the magnetic induction read is directed upwards ( ↑ ).

Although such a procedure is satisfactory in certain respects, it suffers from the disadvantage that it cannot be realized in integrated optics. To understand this impossibility, it is briefly necessary to refer to what is a guidance structure produced in integrated optics.

Such a structure generally comprises a thin guidance layer with a high index interposed between two layers with a low index. The light beam is propagated in said guidance layer with an evanescent part in each of the adjacent layers. However, in such a structure two propagation modes are possible, namely a so-called electric transverse mode (designated TE), for which the electric field associated with the electromagnetic wave is in the plane of the guidance layer and a so-called transverse magnetic mode (designated TM), for which it is the magnetic field which is in the plane of the layer. Any wave inclined with respect to these two modes is necessarily broken down into two components, the one being TE and the other TM.

As a result of this constraint, it is not possible in integrated optics to produce a polarizer and an analyzer which do not cross (i.e. whose polarization directions are not at 90° from one another). Thus, the arrangement illustrated in FIG. 3 cannot be obtained in integrated optics, because it uses a polarizer and an analyzer which are not crossed.

On analysing the beam reflected by a magnetic layer in a direction perpendicular to Pi, components +Pm or −Pm will be detected. Unfortunately, the electric signal measured will be the same in both cases, i.e. $A^2 \sin^2 a$. Only a measurement of the phase would make it possible to distinguish between these two polarizations.

In principle, it is therefore excluded to use an integrated optical structure for reading magnetic supports. This exclusion is regrettable, because integrated optics has numerous advantages (compactness, stability, ease of manufacture, etc.). Reading heads produced by this method would therefore be very advantageous.

The object of the present invention is to obviate this difficulty. To this end and according to the invention, use is not made of an analyzer for detecting the polarization component resulting from the action of the magnetic field and instead use is made of an interferometric assembly making it possible to detect the phase of said reflected component.

According to a second feature of the invention, the incident light beam is propagated in the TE mode, but the interferometric assembly functions in the TM mode. For this purpose, a mode converter network (TE→TM) is placed on the beam return path, in such a way that the part of the beam which is still in the TE mode after reflecting on the magnetic support is partly converted into the TM mode. The conversion beam will constitute a reference beam with which the measuring beam resulting from the magneto-optical interaction will be made to interfere. This reference beam is particularly useful, because it will have undergone the same effects as the measuring beam. In particular, these two beams would be subject to the same fluctuations resulting from flight or trajectory height variations (i.e. the distance separating the trajectory path from the magnetic support).

Through the formation of this reference beam from the return beam, it would be possible by interferometry to know whether the TM mode reflected by the magnetic support has one phase or the opposite phase and no parasitic phenomenon would affect this phase detection.

Finally, as the interferometric assembly functions in the TM mode, it will not be sensitive to possible parasitic beams coming from the incident beam, because they will be in the TE mode.

More specifically, the present invention relates to a reading head in integrated optics for the reading of information recorded on a magnetic support having a magnetization directed in one or other of two opposite directions, said head being characterized in that it comprises:

a light source emitting a light beam;
a structure for the optical guidance of said beam, said structure having a substrate and a stack of a first, a second and a third transparent layers, the second layer having a higher index than the first and third layers which border it, the light beam emitted by the source penetrating the second layer of the structure;
a polarizer integrated into the structure and constituted by a metal layer deposited on the third layer, said polarizer attenuating the transverse magnetic propagation mode and thus aiding the transverse electric propagation mode;
a collimation optics integrated into the structure and located at the output of the polarizer and supplying a parallel light beam in the TE mode;
a mirror having a parabolic surface perpendicular to the plane of the layers and obtained by etching the latter, said mirror receiving the parallel light beam from the collimation optics and supplying a focused beam in the TE mode directed towards the magnetic support to be read, said beam being reflected on said support, which gives rise to a return beam having a first part still in the TE mode and a second part in the TM mode, said second part having a phase dependent on the direction of the magnetization of the support, said return beam striking against the parabolic mirror and is reflected thereon, giving rise to a parallel return beam;
a polarization converter diffractive grating placed on the path of the parallel return beam and integrated into the structure, said grating having an inclination with respect to the direction of the return beam and a spacing such that the part in the TE mode of the return beam is partly converted into the TM mode by Bragg diffraction, the part in the TM mode of said same return beam traversing the grating without attenuation;
an interferometric assembly functioning in the TM mode and able to bring about interference between the beam in the TM mode diffracted by the diffractive grating and the beam in the TM mode which has traversed said grating; a photodetector located at the output of the interferometric assembly, said photodetector supplying an electric signal, whereof one component is ultimately dependent on the direction of the magnetization read on the support.

Figure 4:
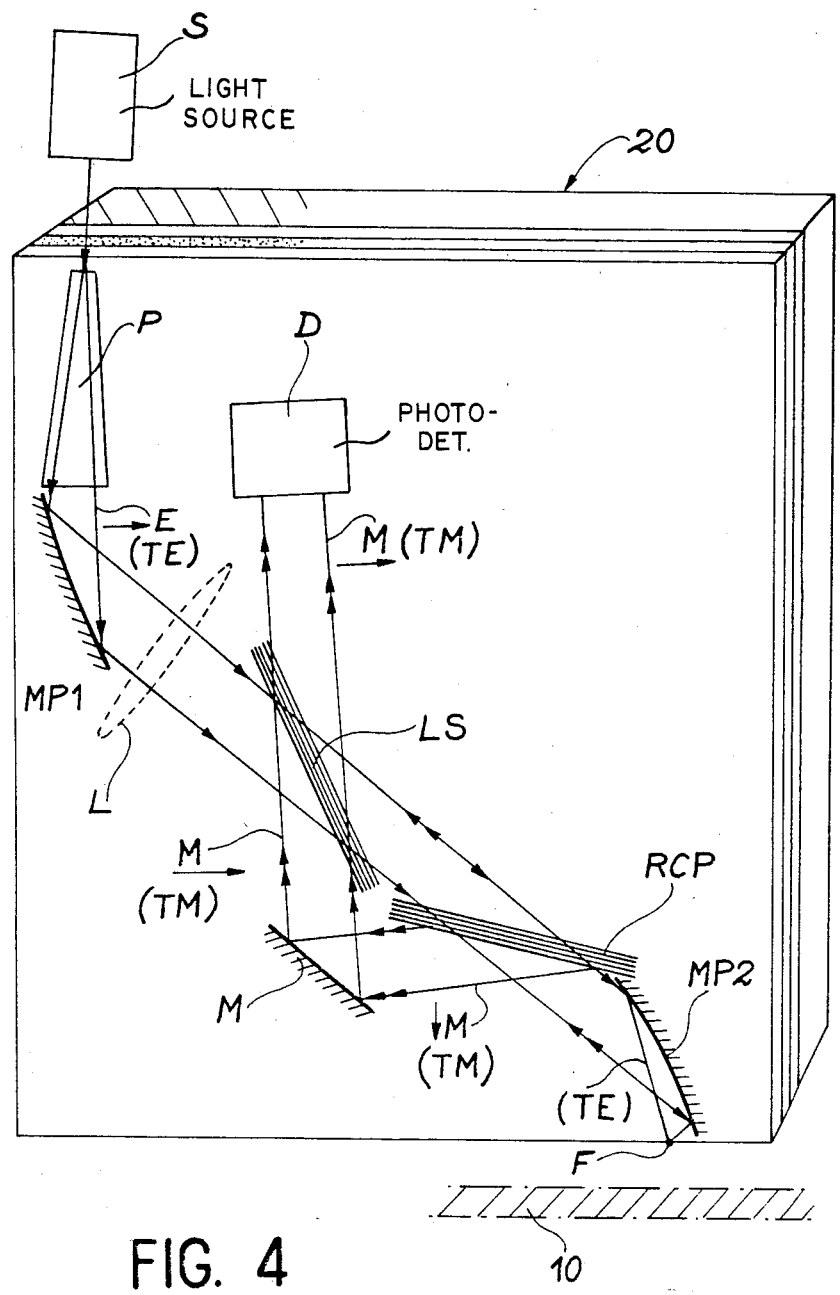
Figure 5:
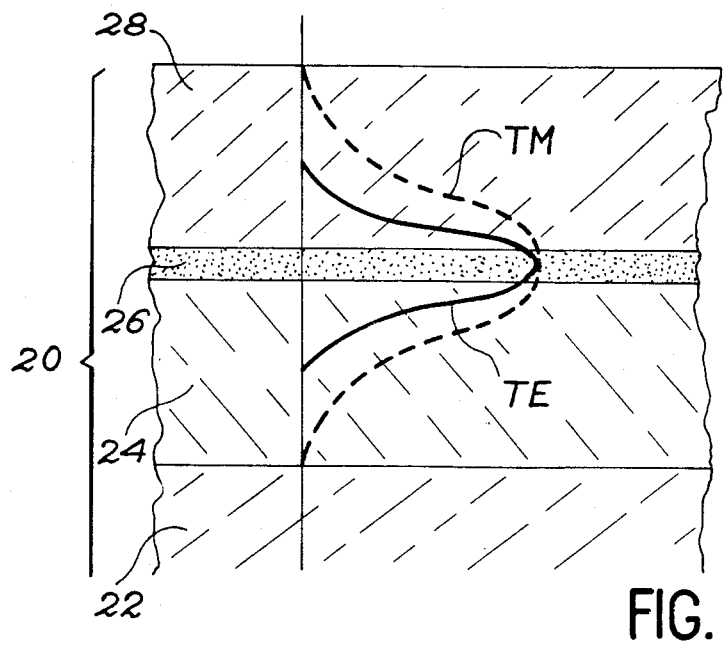
Figure 6:
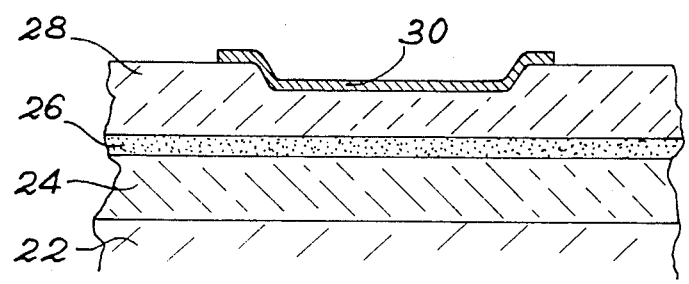
Figure 7:
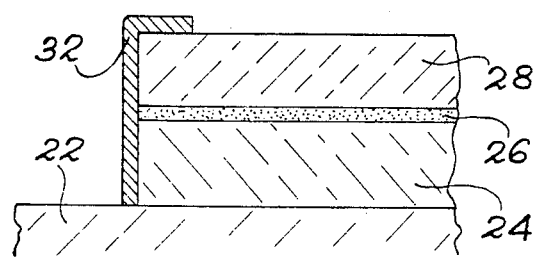
Figure 8:
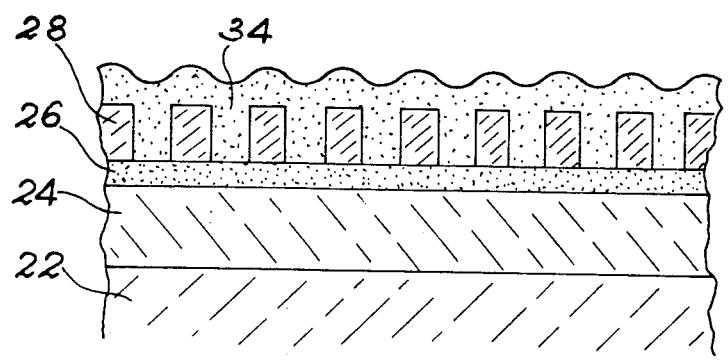
Figure 10:
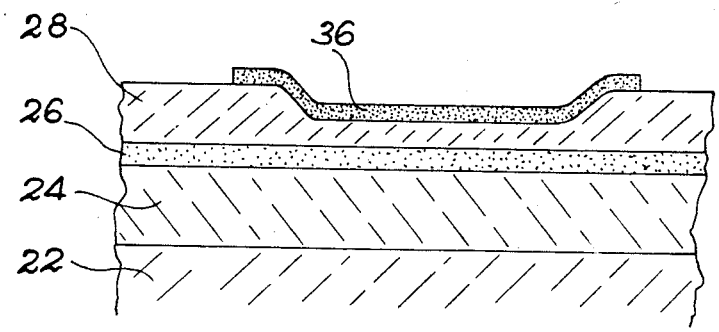
Figure 11:
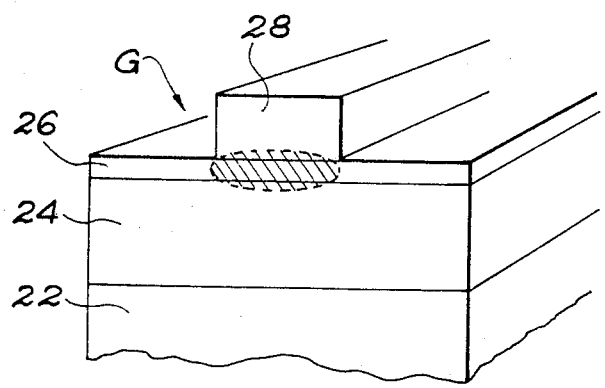
Figure 9:
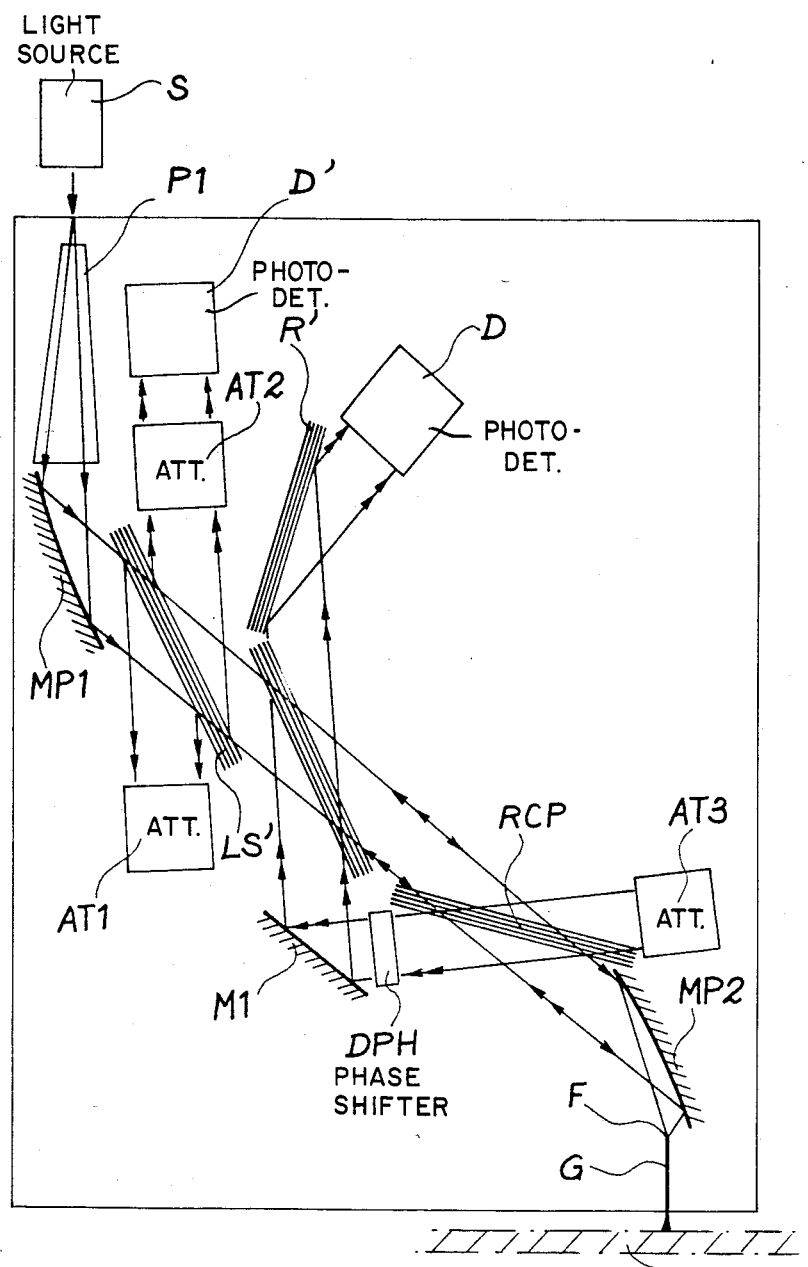
Figure 12:
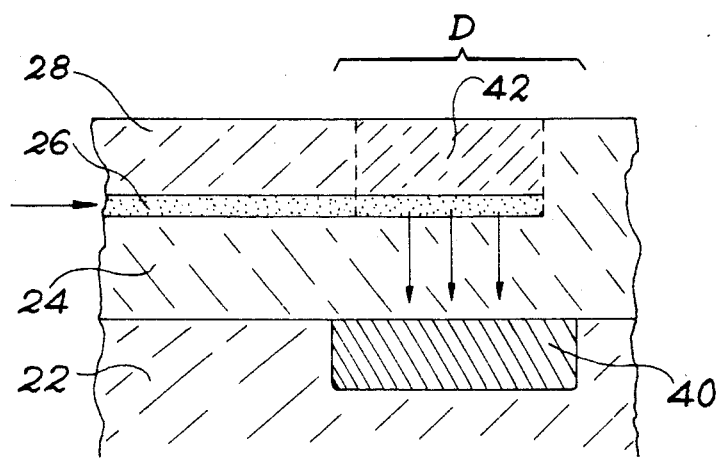

The features of the invention can be better understood from reading the following description of non-limitative embodiments and with reference to the attached drawings, wherein show:

FIGS. 1a and 1b, already described, the magnetic recording principle;
FIG. 2, already described, the principle of the optical reading of a magnetic support;
FIG. 3, already described, the various components involved in an optical reading method;
FIG. 4, in plan view, an integrated optics reading head according to the invention;
FIG. 5, in section, the guidance structure;
FIG. 6 an embodiment of a polarizer;
FIG. 7 an embodiment of a mirror;
FIG. 8 an embodiment of a grating;
FIG. 9 a reading head according to the invention, provided with various accessories;
FIG. 10 an embodiment of a phase shifter;
FIG. 11 an embodiment of an optical output guide;
FIG. 12 an embodiment of an integrated detector, and
FIG. 13 a variant in which the light source is integrated into the guidance structure.

The device shown in FIG. 4 comprises a light source S and a guidance structure 20, whose construction can be better gathered from the description relative to FIG. 5. Various components are integrated into said structure, namely a polarizer P, a collimation optics which, in the illustrated embodiment, is constituted by a cylindrical mirror with a parabolic section MP1, but which could also be constituted by a plane mirror and a lens L (in broken line form). The device also comprises a cylindrical mirror with a parabolic section MP2, which focuses the light which it receives at a point F, a polarization conversion grating RCP, a mirror M placed on the path of the beam diffracted by grating RCP and a semitransparent plate LS, which recombines the beam which it partly reflects with the beam coming from mirror M. The assembly also comprises a photodetector D, which may or may not be integrated into the guidance structure.

The device functions in the following way. Polarizer P attenuates the TM mode present in the beam supplied by source S and supplies a beam exclusively in the TE mode (as can be better gathered following the description relative to FIG. 6). This means that the electric field E is in the plane of the drawing. From said divergent beam, the collimation optics give a parallel light beam which strikes the parabolic mirror MP2. The reflected beam converges at F, in the vicinity of the magnetic support 10 which it is wished to read.

After reflection on said support, the beam returned into the guidance structure has a part in the TE mode (i.e. the most important part) and a part in the TM mode, which results from the magneto-optical effect produced by the support. The part in the TM mode has a magnetic field M in the plane of the drawing (and consequently an electric field perpendicular to the plane of said same drawing).

The intensity of the TE mode is $A^2(1-\sin^2 a)$ and that of the TM mode is $A^2 \sin^2 a$, but with an amplitude $+A \sin a$ or $-A \sin a$ according to the direction of the magnetization encountered.

The return beam, once reflected by the parabolic mirror MP2, encounters the grating RCP. As will be better shown hereinafter, the TE and TM modes are not exactly of the same effective wavelength, because the effective indexes characterizing these modes are not the same. The inclination of the grating with respect to the incident beam (or the angle of incidence $\theta$ with respect to the normal to the grating and the spacing p of the grating are regulated so that the well known Bragg condition: $2p\cdot\cos\theta = \lambda TE$ is satisfied). This condition is only satisfied for the TE mode. In this expression, $\lambda TE$ is the wavelength corresponding to the TE mode, namely $\lambda 0/NeffTE$, if $\lambda 0$ is the wavelength in the vacuum of the incident beam and NeffTE the effective index of the TE mode.

Under these conditions, the part of the incident beam which is in the TE mode will be partly converted (approximately 50%) into the TM mode by diffraction. The diffracted beam will then be in the TM mode. Moreover, the part of the beam in the TM mode which strikes the grating will not be diffracted, because its wavelength $\lambda TM$ does not satisfy the aforementioned Bragg condition.

Mirror M reflects the diffracted beam towards a semi-transparent plate LS, which can also be constituted by a grating. This plate partly reflects the incident beam in the TM mode.

Thus, elements RCP, M and LS constitute an interferometric assembly. Naturally, others can be used, such as in lozenge form, with two parallel arms, etc. The two beams in the TM mode interfere and the result of the interference is detected by detector D.

The beam diffracted by grating RCP constitutes a reference beam coming from the TE mode, which has undergone all the fluctuations undergone by the TM mode resulting from the reflection on the magnetic support.

On designating by r the amplitude of the reference beam and by m the amplitude of the measuring beam, the interference will lead to the appearance of an intensity of form:

$$r^2 + m^2 + 2rm \cos \phi$$

in which the angle $\phi$ is equal to 0 or $\pi$ as a function of the direction of the magnetization of the support. Thus, a signal will be detected which is equal to:

$$r^2 + m^2 + 2rm \text{ or to } r^2 + m^2 - 2rm.$$

The quantity $r^2 + m^2$ represents a fixed component. The signal variation in the magnetization direction is equal to 4rm. This variation is proportional to r. The signal-to-noise ratio is also proportional to rm. The relatively large amplitude (r) of the reference beam with respect to the amplitude (m) of the measuring beam is consequently in certain cases an advantageous factor, both as regards the stability and as regards the signal to noise ratio.

FIG. 5 shows in section the guidance structure 20. In known manner, such a structure has an e.g. silicon substrate 22, a first layer 24, e.g. of silica $SiO_2$ of index 1.45, a second layer 26, e.g. of $Si_3N_4$ of index 2 and a third layer 28, e.g. of $SiO_2$ of index 1.45. The thickness of the first and third layers is approximately 1.5 to 3 $\mu$m, while that of the interpolated layer is approximately 0.1 to 0.2 $\mu$m. The light wave is guided by layer 26. In reality, the wave is present in each of the adjacent layers 24 and 28 in the form of evanescent waves. However, the spreading out of the beam is not the same for the propagation mode TE and for the propagation mode TM, the latter being further spread than the former.

The effective index of a light beam propagating in such a structure is not only dependent on the real index of the layers traversed, but also on the dimensions thereof and the nature of the mode. As the modes TE and TM do not have the same spatial distribution, it is clear that they do not have the same effective indexes. On designating by $\lambda 0$ the wavelength in the vacuum of the light used and by NeffTE and NeffTM the effective indexes in the TE mode and TM mode, these modes would have two different wavelengths $\lambda TE$ and $\lambda TM$:

$$\lambda TE = \frac{\lambda O}{NeffTE} \text{ and } \lambda TM = \frac{\lambda O}{NeffTM}$$

The wavelength variation $\Delta\lambda$ is dependent on the variation between the effective indexes $\Delta$Neff through the formula:

$$\frac{\Delta\lambda}{\lambda} = \frac{\Delta Neff}{Neff}$$

The variation $\Delta$Neff is approximately 0.1 and Neff is approximately 1.6, so that the variation $\Delta\lambda$ is approximately 500 Angstroms. The various components appearing in the device of FIG. 4 are based on this wavelength variation between the TE and TM modes. For said variation to be as large as possible, the interpolated layer 26 is given a limited thickness, e.g. approximately 0.1 to 0.2 $\mu$m.

It should be observed that if the collimation structure working on the input beam can be realized in catadioptric or dioptric form (i.e. with a mirror or a lens), with regards to the collimation structure working on the return beam, it must necessarily be catadioptric, because the return beam contains two different modes TE and TM of different wavelengths, whereas the input beam only contains a single mode TE, with a single wavelength.

The components used in the device of FIG. 4 will now be described in greater detail. The device shown in FIG. 6 is a polarizer corresponding to polarizer P of FIG. 4. The upper layer 28 is partly etched and the etched part is covered with a metal layer 30. Mode TM will be greatly absorbed by said layer, as a result of its spread, whereas mode TE will not be affected. Such a device consequently eliminates the part in the TM mode included in the incident beam and supplies a beam exclusively in the TE mode.

FIG. 7 shows a mirror. Layers 24, 26 and 28 are etched up to substrate 22. A metal layer 32 is deposited on the side of the etched layers (but this layer is not indispensable, the diopter between the layers and air can in certain cases constitute a total reflection diopter).

FIG. 8 shows a diffractive grating. The upper layer 28 is etched up to layer 26 and a dielectric 34 is deposited on the etched assembly. Thus, the propagation conditions vary periodically in the guidance layer, which leads to diffraction phenomena (so-called index grating).

Grating RCP must be able to distinguish between two wavelengths spaced by $\Delta\lambda = |\lambda TE - \lambda TM \uparrow$. In the example given hereinbefore, it has been seen that $\Delta\lambda$ was approximately 500 Angstroms. However, the selectivity of the grating must exceed the wavelength fluctuations which can result from various parasitic phenomena, particularly the fluctuation of the wavelength of the light source. This uncertainty is approximately 100 Angstroms. The wavelength selectivity of the grating must therefore be between approximately 100 and 500 Angstroms.

The device according to FIG. 5 represents a basic diagram. In reality, the reading head will be completed by various accessory, but useful means, which are shown in FIG. 9.

In FIG. 9 the reading head also comprises, apart from the elements described relative to FIG. 5, a second semitransparent plate LS' associated with a second detector D', a supplementary grating R' positioned in front of the main detector D, a phase shifter DPH located on the path of the beam diffracted by grating RCP, various attenuators AT1, AT2, AT3 and a guide pipe G at the output from the device. Detector D' makes it possible to detect the intensity of the return beam and permits an auto-regulation of the light source.

Grating R' reflects the TM mode and permits the passage without attenuation of the TE mode, if said mode remains in the beam to be measured. Thus, this mirror serves to perfect the selectivity of the interferometric assembly.

Phase shifter DPH is important for the following reasons. The interfering beams, namely the reference beam diffracted by grating RCP and the measuring beam which has traversed said same beam have a phase which is not strictly equal to $\pi$ or to 0, as a function of the encountered magnetic field direction. This phase is equal to $(\phi M + \phi 0)$, in which M is equal to 0, or to $\pi$ and where $\phi 0$ is a phase shift due to the difference of the optical paths followed by the two beams. Thus, detector D detects one of the two following signals:

$r^2 + m^2 + 2rm \cos \phi 0$ $r^2 + m^2 - 2rm \cos \phi 0$.

If, unfortunately by design, $\phi 0$ is equal to $\pi/2$ or more generally to $(2k+1)\pi/2$, the difference between the two detected values will be zero. To avoid this disadvantageous situation, a phase shifter DPH is added, which introduces a phase shoft $\phi 1$. In the detected signal, the term sensitive to the phase will therefore be of form $\cos(\phi 0 + \phi 1)$. If $\phi 0$ is close to $(2k+1)\pi/2$, $\phi 1$ will be given a value close to $(2k'+1)\pi/2$, so that the total phase is close to $(k+k'+2)\pi$, which leads to a maximum sensitivity.

A possible embodiment of such a phase shifter is shown in FIG. 10. The upper layer 28 is partly etched and the etched part is covered with a dielectric 36. This dielectric changes the propagation constant in the guidance layer 26 and introduces a phase shift proportional to the length of the dielectric.

With regards to the output guide G, it makes it unnecessary to have a focal point F disposed on the output face of the reading head. With such a guide, it is merely necessary to place the input thereof at the focal point F and to have a guidance pipe towards the output face and which is not necessarily rectilinear.

FIG. 11 shows an embodiment of such a guide G. Upper layer 28 is etched so as to only leave a rectilinear or curved bar with a width of approximately 1 $\mu$m. The light beam will follow this superstructure in the guidance layer. It is also possible to use several guide pipes of this type, either arranged in parallel, or in fan-like manner.

Detector D can be integrated into the head. An integrated optics detector is described in French Pat. No. 2578986 issued 9-19-86. As shown in FIG. 12, said detector comprises a PN junction 40 formed in the silicon substrate 22 and a diffractive grating 42 able to reflect the beam propagating in guidance layer 26 towards junction 40.

Such a detector is in itself selective with respect to the propagation mode. It can be designed so as to only be sensitive to the TM mode, which further increases the selectivity of the interferometric device.

Figure 13:
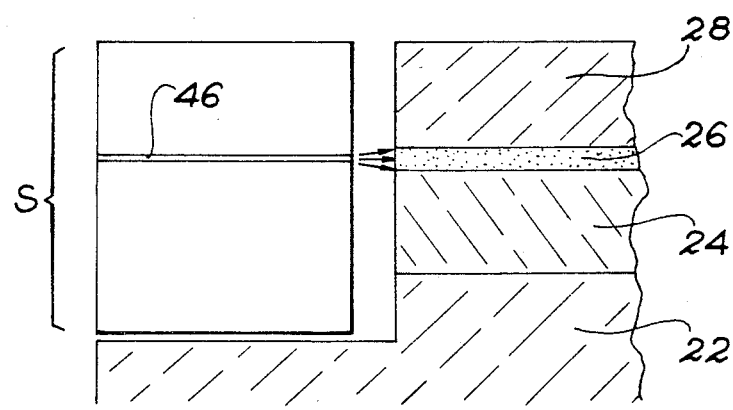

Source S can be connected by optical fiber to the guidance structure. However, it can also be integrated into the latter, as illustrated in FIG. 13. In this case, source S is fixed to the substrate 22 and mounted in such a way that its active layer 46 is at the height of the guidance layer 26.

The gratings used in the aforementioned device can be obtained by holography or preferably by electronic masker.

It is possible to choose an incidence angle of 63°43' (which corresponds to arctan 2, which can easily be obtained with an electronic masker). The spacing of the grating is then equal to $\lambda 0/2 N_{eff} \cos \theta$. For a wavelength of 0.8 $\mu$m and an index of 1.6, the spacing is then 0.56 $\mu$m.

The gratings could have about one hundred lines. They would therefore have a width of approximately 40 $\mu$m, which is small and the overall dimensions of the components are small.

The aforementioned reading head can be placed on a $1 \times 1$ mm or smaller plate or board. This head can be mounted on a conventional trajectory member, which can also contain a magnetic recording head. The fluctuations of the trajectory height are not important because, as has been seen, the two interfering beams undergo the same fluctuations. Thus, the effects thereof do not affect the final result of the measurement.

I claim:

1. A reading head in integrated optics for the reading of information recorded on a magnetic support (10) having a magnetization directed in one or other of two opposite directions, said head being characterized in that it comprises:

a light source (5) emitting a light beam;
a structure for the optical guidance of said beam, said structure having a substrate (22) and a stack of a first,
a second and a third transparent layers (24, 26, 28), the second layer (26) having a higher index than the first and third layers (24, 28) which border it, the light beam emitted by the source penetrating the second layer (26) of the structure;
a polarizer (P) integrated into the structure and constituted by a metal layer (30) deposited on the third layer (28), said polarizer attenuating the transverse magnetic propagation mode (TM) and thus aiding the transverse electric propagation mode (TE);
a collimation optics (MP1) integrated into the structure and located at the output of the polarizer and supplying a parallel light beam in the mode (TE);
a mirror (MP2) having a parabolic surface perpendicular to the plane of the layers and obtained by etching the latter, said mirror receiving the parallel light beam from the collimation optics and supplying a focused beam in the mode (TE) directed towards the magnetic support to be read, said beam being reflected on said support, which gives rise to a return beam having a first part still in the mode (TE) and a second part in the mode (TM), said second part having a phase dependent on the direction of the magnetization of the support, said return beam striking against the parabolic mirror (MP2) and being reflected thereon, giving rise to a parallel return beam;

a polarization converter diffractive grating (RCP) placed on the path of the parallel return beam and integrated into the structure, said grating (RCP) having an inclination ($\theta$) with respect to the direction of the return beam and a spacing (p) such that the part in the mode (TE) of the return beam is partly converted into the mode (TM) by Bragg diffraction, the part in the mode (TM) of said same return beam traversing the grating (RCP) without attenuation:

an interferometric assembly (M, LS) functioning in the mode (TM) and able to bring about interference between the beam in the mode (TM) diffracted by the diffractive grating and the beam in the mode (TM) which has traversed said grating;

a photodetector (D) located at the output of the interferometric assembly, said photodetector supplying an electric signal, whereof one component is ultimately dependent on the direction of the magnetization read on the support.

2. A reading head according to claim 1, characterized in that the interferometric assembly comprises a reflector (M) located on the path of the beam diffracted by the polarization converter grating (RCP) and a separating plate (LS) placed on the path of the return beam transmitted by the converter grating, the beam reflected by the reflector (M) and the beam partly reflected by the separating plate (LS) coinciding and interfering, photodetector (D) being located on the common path of these two beams.

3. A reading head according to claim 1, characterized in that it also comprises a phase shifter (DPH) placed in the path of the beam diffracted by the polarization converter grating (RCP).

4. A reading head according to claim 1, characterized in that the optical guidance structure also comprises a light microguide (G) having one end placed at the focusing point (F) of the parabolic mirror (MP2) and another end issuing onto the output face of the head in the vicinity of the magnetic support to be read (10).

5. A reading head according to claim 1, characterized in that the collimation optics are constituted by a mirror (MP1) having a parabolic surface perpendicular to the plane of the layers and obtained by etching the latter.

6. A reading head according to claim 1, characterized in that the photodetector (D) is integrated into the guidance structure and comprises a PN junction (40) integrated into substrate (22) and a diffractive grating (42) integrated into the stack of layers and able to diffract the beam guided by the second layer towards the PN junction.

7. A reading head according to claim 1, characterized in that the light source (S) is coupled to the guidance layer by an optical fiber.

8. A reading head according to claim 1, characterized in that the light source (S) is integrated into the substrate.

9. A reading head according to claim 1, characterized in that the guidance structure also comprises a second separating plate (LS') positioned on the path of the light which has traversed the first separating plate and a second photodetector (D') placed on the path of the beam reflected by said second separating plate (LS').

* * * * *